_(12)_ United States Patent
Park et al.

(10) Patent No.: US 8,601,436 B2
(45) Date of Patent: Dec. 3, 2013

(54) SIMULATION-BASED INTERFACE TESTING AUTOMATION SYSTEM AND METHOD FOR ROBOT SOFTWARE COMPONENTS

(75) Inventors: Hong Seong Park, Seoul (KR); Jeong Seok Kang, Jeollabuk-do (KR); Hyeong Seob Choi, Gangwon-do (KR); Sang Woo Meng, Donghae-si (KR); Si Wan Kim, Chuncheon-si (KR)

(73) Assignee: KNU-Industry Cooperation Foundation (KR)

( * ) Notice: Subject to any disclaimer, the term of this patent is extended or adjusted under 35 U.S.C. 154(b) by 367 days.

(21) Appl. No.: 12/853,475

(22) Filed: Aug. 10, 2010

(65) Prior Publication Data

US 2011/0307860 A1 Dec. 15, 2011

(30) Foreign Application Priority Data

Jun. 9, 2010 (KR) .................. 10-2010-0054212

(51) Int. Cl.
*G06F 9/44* (2006.01)
(52) U.S. Cl.
USPC ..................... 717/107; 717/124; 717/135
(58) Field of Classification Search
None
See application file for complete search history.

(56) References Cited

U.S. PATENT DOCUMENTS

| | | | |
|---|---|---|---|
| 6,505,342 B1 * | 1/2003 | Hartmann et al. | 717/107 |
| 6,698,012 B1 * | 2/2004 | Kossatchev et al. | 717/126 |
| 6,941,543 B1 * | 9/2005 | Brown et al. | 717/107 |
| 6,944,584 B1 * | 9/2005 | Tenney et al. | 703/22 |
| 7,296,188 B2 * | 11/2007 | Paternostro et al. | 717/124 |
| 7,373,636 B2 * | 5/2008 | Barry et al. | 717/124 |
| 7,502,728 B1 * | 3/2009 | Hurlock et al. | 717/135 |
| 7,747,984 B2 * | 6/2010 | Hsu | 717/124 |
| 7,801,710 B2 * | 9/2010 | Sturrock et al. | 717/135 |
| 7,890,194 B2 * | 2/2011 | Pannese | 700/17 |
| 7,958,488 B2 * | 6/2011 | Cifra | 717/107 |
| 8,245,194 B2 * | 8/2012 | Atkin et al. | 717/124 |
| 8,291,387 B2 * | 10/2012 | Pal et al. | 717/135 |
| 8,301,421 B2 * | 10/2012 | Bacon et al. | 717/135 |
| 8,417,506 B2 * | 4/2013 | Sturrock et al. | 717/135 |
| 2003/0005417 A1 * | 1/2003 | Gard et al. | 717/135 |
| 2003/0079207 A1 * | 4/2003 | Xavier et al. | 717/135 |
| 2003/0167454 A1 * | 9/2003 | Iordanov et al. | 717/104 |
| 2004/0123272 A1 * | 6/2004 | Bailey et al. | 717/135 |
| 2007/0044078 A1 * | 2/2007 | Cifra | 717/135 |
| 2007/0050758 A1 * | 3/2007 | Arevalo et al. | 717/135 |
| 2007/0168970 A1 * | 7/2007 | Li et al. | 717/124 |
| 2008/0115114 A1 * | 5/2008 | Palaparthi et al. | 717/128 |
| 2008/0301651 A1 * | 12/2008 | Seneski et al. | 717/124 |
| 2009/0158249 A1 * | 6/2009 | Tomkins et al. | 717/107 |
| 2011/0099540 A1 * | 4/2011 | Bae et al. | 717/135 |

OTHER PUBLICATIONS

Microsoft, Microsoft Computer Dictionary, 2002, Microsoft Press, Fifth Edition, (4 pages total).*

(Continued)

*Primary Examiner* — Thuy Dao
*Assistant Examiner* — Ravi K Sinha
(74) *Attorney, Agent, or Firm* — Hayes Soloway P.C.

(57) ABSTRACT

A testing tool for verifying a reliability of robot software components is provided, and more particularly, a simulation-based interface testing automation system and method that may automatically perform a test for functions and performance of an interface with respect to robot software components are provided. Thus, it is possible to efficiently perform a test for an interface of robot software components. In particular, it is possible to automatically generate test cases required for testing, to perform a test in various languages, and to perform a test suitable for a robot.

11 Claims, 11 Drawing Sheets

(56) References Cited

OTHER PUBLICATIONS

Biggs, Geoffrey, Applying regression testing to software for robot hardware interaction, [Online] May 2010 Robotics and Automation (ICRA), 2010 IEEE International Conference on, [Retrieved from the internet] <http://ieeexplore.ieee.org/stamp/stamp.jsp?tp=&arnumber=5509206> pp. 4621-4626.*

Chen et al., A simulation environment for OpenRTM-aist, [Online] Jan. 2009 System Integration, 2009. SII 2009. IEEE/SICE International Symposium on [Retrieved from the Internet] <http://ieeexplore.ieee.org/stamp/stamp.jsp?tp=&arnumber=5384547> pp. 113-117.*

Cote, Carle, et al., Robotic software integration using MARIE, [Online] 2006 International Journal of Advanced Robotic Systems 3.1 (2006), [Retrieved from the Internet] <http://cdn.intechweb.org/pdfs/4163.pdf> pp. 55-60.*

Nesnas, Issa A., et al., CLARAty: Challenges and steps toward reusable robotic software, [Online] 2006 International Journal of Advanced Robotic Systems 3.1 (2006), [Retrieved from the Internet] <https://claraty.jpl.nasa.gov/main/overview/publications/05_nesnas_challenges_jars.pdf> pp. 023-030.*

* cited by examiner

FIG. 9

| Case View | | | |
|---|---|---|---|
| No. | IndexOfSensor | NumOfSensor | #Distance |
| 1 | 5 | 1 | -1 |
| 2 | 11 | 7 | 5.7 |
| 3 | 11 | -1 | 11.5 |
| 4 | -1 | 1 | 5.7 |
| 5 | 11 | 4 | -1 |
| 6 | 5 | 4 | 0.5 |
| 7 | -1 | 4 | 11.5 |
| 8 | 0 | 1 | 0.5 |
| 9 | 5 | 7 | 11.5 |
| 10 | 11 | 1 | 0.5 |
| 11 | 0 | 1 | 11.5 |
| 12 | 0 | 4 | 5.7 |
| 13 | 5 | -1 | 5.7 |
| 14 | 0 | -1 | -1 |
| 15 | -1 | -1 | 0.5 |
| 16 | -1 | 7 | -1 |
| 17 | 0 | 7 | 0.5 |

FIG. 10

```
void
IRTestDriver::runTest(const std::string tcFile, const std::string trFile)
{
// Read test case file
TestSuiteRW *tcr = new
TestSuiteRW("IRSensor_IRServiceInterface_TC", tcFile);
tcr->openTS();
TestTimeUtil::init_timer(); //Init timer
int numOfTc = tcr->getSizeOfTC();
for(int cntOfTc=0; cntOfTc< numOfTc; cntOfTc++){
// Type casting of test case value
struct testCaseInfo *tc = tcr->getTestCase(cntOfTc);
ArgInfoList *argList = tc->pArgList;
string *strIndex = argList->getArgInfo(0)->value;
string *strNumOfSensor = argList->getArgInfo(1)->value;
string *strDistance = argList->getArgInfo(2)->value;
int intIndex = String2Integer(strIndex->c_str());
int intNumOfSensor = String2Integer(strNumOfSensor->c_str());
double doubleDistance = String2Double(strDistance->c_str());
// moving a wall in the robot simuator
ObstacleControlComp->moveWall(doubleDistance);
// Invocation target test interface
double resTime = 0.0;
TestTimeUtil::start_timer(1);
double ret = IRSensorCompObj->getDistanceValue(intIndex,
intNumOfSensor);
resTime = TestTimeUtil::get_timer(1);
// Comparing test result
string strResTime, strRet;
Double2String(ret, strRet);
Double2String(resTime, strResTime);
struct ER_Info *erInfo = tc->pERList->getERInfo(0);
bool erValue =
String2Bool(erInfo->ERstrCandidates->getString(0)->c_str());
string pf = "FAIL";
if(erValue == ret) pf = "PASS";
```

FIG. 11

Result View   ☒

| Test Result | Performance |

Component Name : IRSensor Component
Interface Name : getDistanceValue

| IndexOfSensor | NumOfSensor | #Distance | return | result |
|---|---|---|---|---|
| 5 | 1 | -1 | -1 | PASS |
| 11 | 7 | 5.7 | -1 | PASS |
| 11 | -1 | 11.5 | -1 | PASS |
| -1 | 1 | 5.7 | -1 | PASS |
| 11 | 4 | -1 | -1 | PASS |
| 5 | 4 | 0.5 | 0.5 | PASS |
| -1 | 4 | 11.5 | -1 | PASS |
| 0 | 1 | 0.5 | 0.5 | PASS |
| 5 | 7 | 11.5 | -1 | PASS |
| 11 | 1 | 0.5 | -1 | PASS |
| 0 | 1 | 11.5 | -1 | PASS |
| 0 | 4 | 5.7 | 5.7 | PASS |
| 5 | -1 | 5.7 | -1 | PASS |

# SIMULATION-BASED INTERFACE TESTING AUTOMATION SYSTEM AND METHOD FOR ROBOT SOFTWARE COMPONENTS

CROSS-REFERENCE TO RELATED APPLICATION

This application claims the benefit of Korean Patent Application No. 10-2010-0054212, filed on Jun. 9, 2010, in the Korean Intellectual Property Office, the disclosure of which is incorporated herein by reference.

BACKGROUND

1. Field of the Invention

The present invention relates to a testing tool for verifying a reliability of robot software components, and more particularly, to a simulation-based interface testing automation system and method that may automatically perform a test for functions and performance of an interface with respect to robot software components.

2. Description of the Related Art

A conventional software component testing scheme may be divided into a source code-based testing scheme, a Built-in Test (BIT)-based testing scheme, and a component user specification-based testing scheme according to information required for testing.

The source code-based testing scheme may enable analysis of data flow information or control flow information on a source code as a test driver code used to generate a test case or perform a test based on source code information, when a source code of target software exists.

Additionally, in the source code-based testing scheme, a test case may be automatically generated using a symbol execution scheme, and a test driver code may be generated based on source code information to automatically execute the test case. However, it is impossible to perform a test for the target software, when there is no source code of a component.

The BIT-based testing scheme may enable a test case and a test driver code to be built in a component in advance so that a test may be performed, in order to increase a test possibility of the component.

However, the BIT-based testing scheme has disadvantages in that a memory usage or a size of a source code of the component is increased by adding the test case and the test driver code to the component. Additionally, when a component developer does not provide test information, it is impossible to perform the test.

The component user specification-based testing scheme may be used to test a component provided by a user, instead of information provided by a component developer. The component user specification-based testing scheme may break dependencies between a test specification and a component implementation using a Spy Class and an eXtensible Markup Language (XML) adapter module, to increase a reusability of a test and to automatically perform the test.

However, the component user specification-based testing scheme has disadvantages in that a scheme for automatically generating a test case required for testing is not provided, and a test may be performed only in a language such as Java.

Software components for implementing a robot may desirably be operated while being connected to robot hardware in real-time, differently from other software components. Accordingly, to test the robot software components, the robot hardware needs to be directly developed, which may cause troublesome.

Additionally, even when a test stub module is used instead of the robot hardware, a component developer may spend a considerable amount of time and effort to implement both of physical operation and function corresponding to the robot hardware.

SUMMARY

An aspect of the present invention provides a simulation-based interface testing automation system and method that may automatically generate a test case for testing robot software components, and may generate a source code of a test application.

Another aspect of the present invention provides a simulation-based interface testing automation system and method that may generate a test case and a test application for a test of robot software components, and may automatically read a result corresponding to the test case while executing the generated test application.

Still another aspect of the present invention provides a simulation-based interface testing automation system and method that may analyze whether a test target component among robot software components is normally operated, and may enable more accurate testing, by using a robot hardware simulator enabling a simulation of an operation of a robot, instead of using robot hardware.

According to an aspect of the present invention, there is provided a testing automation method including: generating a test case based on interface representation information and test specification information, the interface representation information and the test specification information being associated with a robot software component of a target robot to be tested; generating a source code of a test application based on the test case, the source code being used to test the robot software component; and compiling the source code of the test application using the test case, connecting the source code to a robot hardware simulator while executing the compiled test application, and outputting a result corresponding to the test case.

According to another aspect of the present invention, there is provided a testing automation system including: a testing automation server to generate a test case, and a source code of a test application, based on interface representation information and test specification information, the interface representation information and the test specification information being associated with a robot software component of a target robot to be tested; a test build agent to compile the source code of the test application using the test case, and to output a result corresponding to the test case while executing the compiled test application; and a robot hardware simulator to perform a simulation of virtual robot hardware and a robot test environment based on an operation of the test build agent, the robot hardware simulator being connected to the test build agent.

EFFECT

According to embodiments of the present invention, it is possible to provide a simulation-based robot software component interface testing automation tool, thereby efficiently performing an interface test of robot software components.

In particular, according to embodiments of the present invention, a test case required for testing may be automatically generated and thus, it is possible to perform a test in various languages.

Additionally, according to embodiments of the present invention, a robot hardware simulator may be provided and thus, it is possible to perform a test suitable for a robot.

Additionally, it is possible to perform a test even when actual robot hardware is not yet developed.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 9 is a diagram illustrating an example of a test case generated by the testing automation system of FIG. 8;

FIG. 10 is a diagram illustrating an example of a source code of a test application generated by the testing automation system of FIG. 8; and FIG. 11 is a diagram illustrating a test result in the testing automation system of FIG. 8.

DETAILED DESCRIPTION

Figure 1:
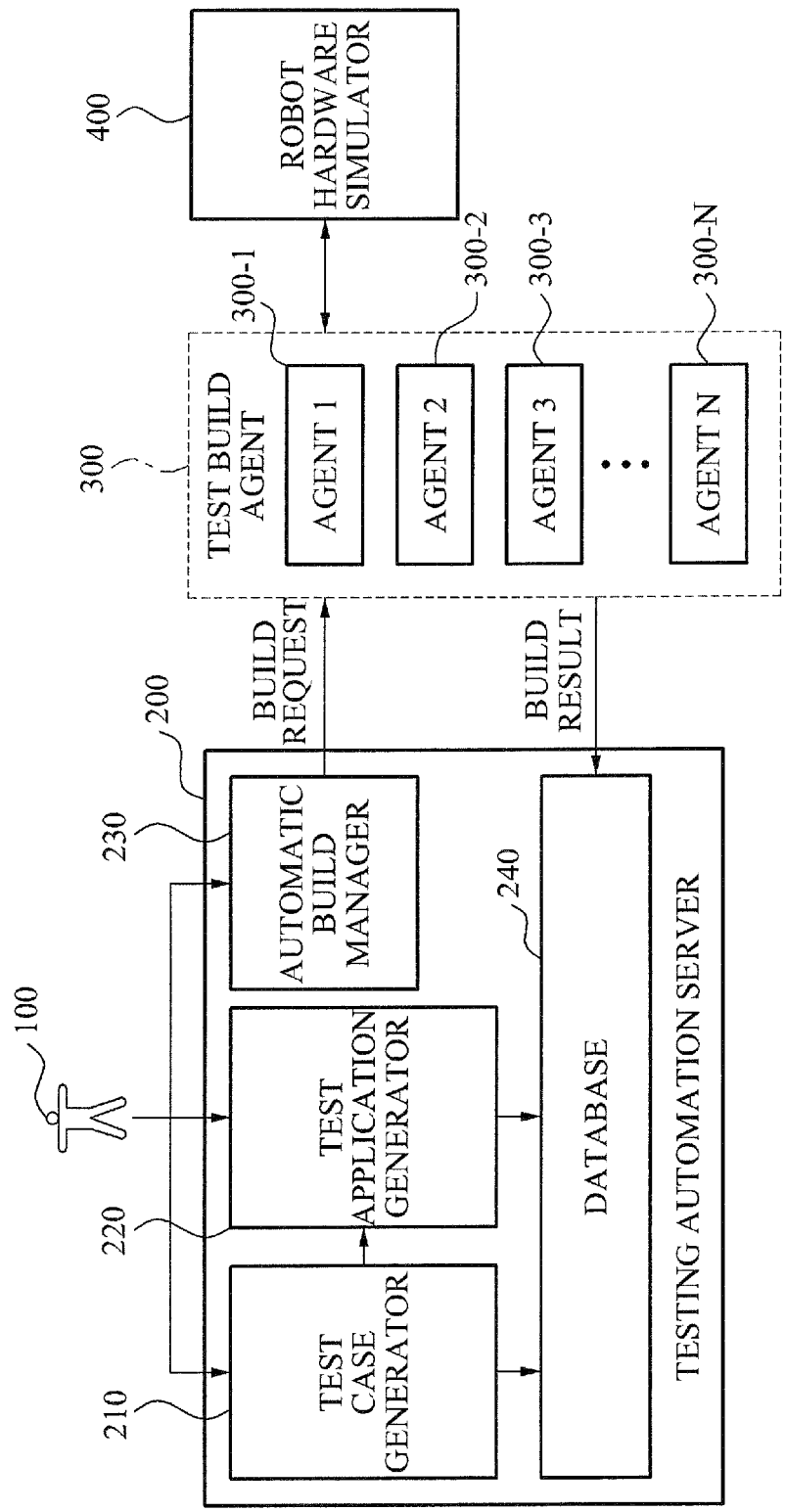
FIG. 1 is a diagram illustrating a configuration of a simulation-based interface testing automation system for robot software components according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a simulation-based interface testing automation system for robot software components according to an embodiment of the present invention.

The system of FIG. 1 includes a testing automation server 200, a plurality of test build agents 300, and a robot hardware simulator 400.

The testing automation server 200 may be implemented as a web-based automatic testing engine server (web-based testing automation engine server) that is accessible by a user through a web service. The testing automation server 200 may generate a test case for an interface test of robot software components. Additionally, the testing automation server 200 may generate a test driver component, a test stub component, and a simulation control component that are required for testing, and may connect the generated components to each other.

The testing automation server 200 may include a test case generator 210, a test application generator 220, an automatic build manager 230, and a database 240 that will be further described with reference to FIG. 2 below.

The test case generator 210 may be used as an interface test case generator, and may receive interface representation information (for example, an Interface Definition Language (IDL) or an eXtensible Markup Language (XML)) and test specification information of a test target component that are input by a user 100, and may automatically generate a plurality of test cases. Here, the test cases may be stored as files in XML format in the database 240. Additionally, the user 100 may modify the test cases in the database 240 and input expected result values for each test case, through a web interface.

Figure 2:
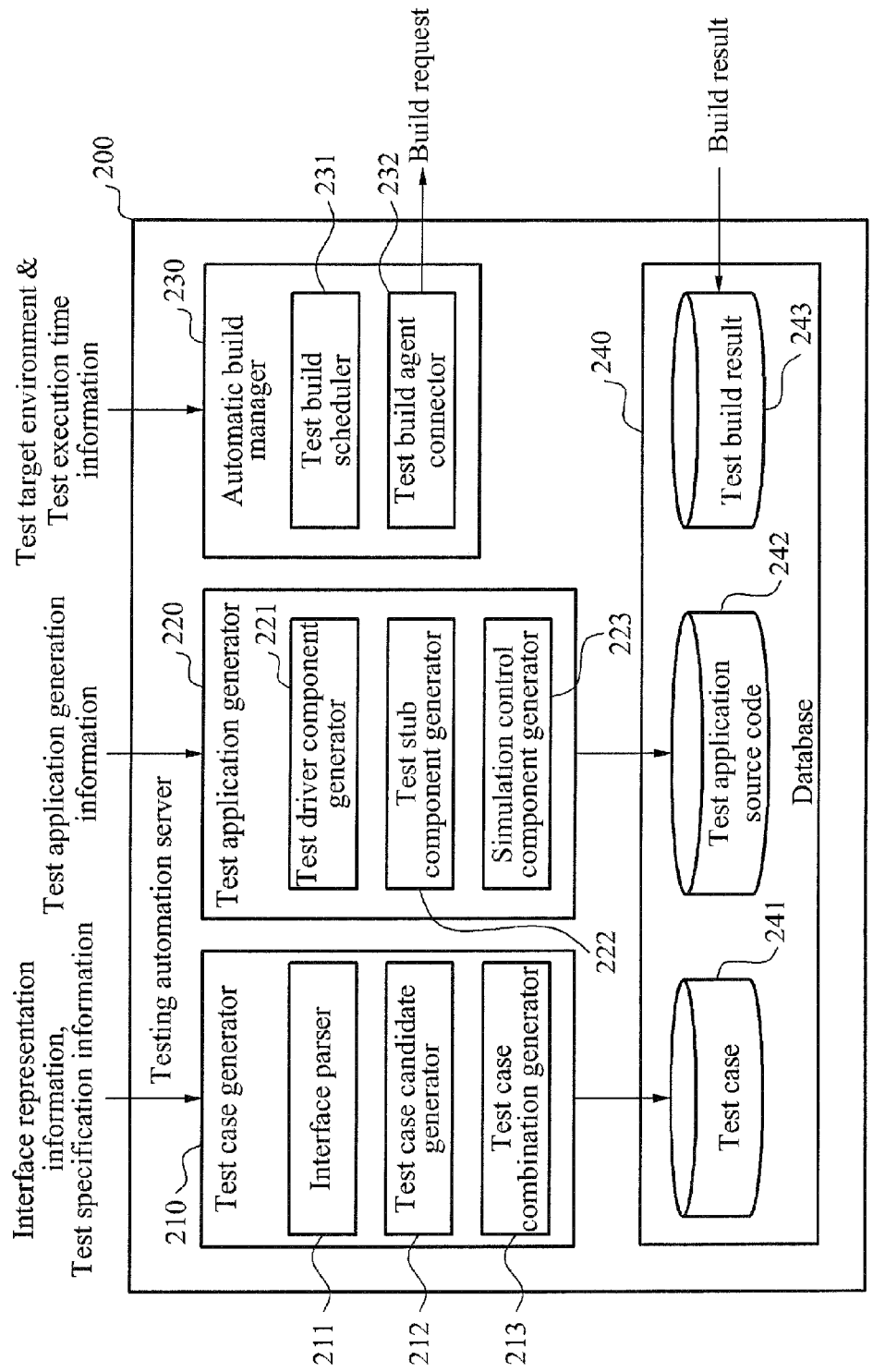
FIG. 2 is a diagram illustrating a testing automation server of FIG. 1.

The test case generator 210 may include an interface parser 211, a test case candidate generator 212, and a test case combination generator 213, as shown in FIG. 2.

The interface parser 211 may parse and analyze the interface representation information (for example, the IDL or the XML) of the test target component, and may extract type information regarding input and output parameters of the test target component.

The test case candidate generator 212 may generate candidate values of the test cases based on the test specification information input by the user 100. Here, the test case candidate generator 212 may generate candidates of a type of a test case for input parameter (hereinafter, referred to as "TCIP"), and a type of a test case for simulation control (hereinafter, referred to as "TCSC").

When the test specification information for each parameter indicates values in a range, not a specific value, the test case candidate generator 212 may automatically generate test case candidates using an equivalence partitioning scheme or a boundary value analysis scheme.

The equivalence partitioning scheme may be performed to partition an input domain into equivalence classes, based on range input conditions, restrictions to a specific value, conditions regarding whether the classes belong to a collection, and logic conditions. The equivalence partitioning scheme may enable a selection of a representative test case candidate for each class, assuming that when an error occurs in data in a class, the same error may occur in another data in the class.

The boundary value analysis scheme is a modification of the equivalence partitioning scheme, and may be used to increase an error detectability based on a fact that errors frequently occur in boundary values of each range when input and output domains are partitioned into equivalence classes. In other words, when selecting a test case in each of the equivalence classes, data on an edge of each class may be used instead of optional data.

The test case combination generator 213 may combine the test case candidates generated by the test case candidate generator 212 using a pair-wise scheme, to reduce a number of test cases.

Here, the pair-wise scheme is an effective test case generation technique that is based on the observation that most faults are caused by interactions of parameters. The pair-wise scheme may be implemented so that a minimum number of pairs of parameters may be formed in all test cases.

The test case combination generator 213 may enable a 2-way combination (namely, pair-wise), a 3-way combination (namely, tri-wise), and all available combinations of parameters, so that the user 100 may remove overlapping test cases among combination pairs of parameters.

As a result, a last test case combined by the test case combination generator 213 may be stored in the database 240.

The test application generator 220 may generate a test driver component used for testing for each test case based on information on the test cases and test target component, and a test stub component for a required interface of the test target component.

The test application generator 220 may include a test driver component generator 221, a test stub component generator 222, and a simulation control component generator 223, to respectively generate a test driver component, a test stub component, and a simulation control component.

The test application generator 220 may generate a simulation control component used for a connection to a robot hardware simulator that enables a simulation instead of robot hardware, and may connect the generated components to each other so that a test may be automatically executed.

The automatic build manager 230 may be used as an automatic test build manager, may be connected to the plurality of test build agents 300 that are installed in a test target environment, and may request a test build. Additionally, the automatic build manager 230 may download a test case and a test application source code in the test target environment, and may store a result of compiling the source code, or performing a test.

The automatic build manager 230 may include a test build scheduler 231, and a test build agent connector 232, as shown in FIG. 2.

When requesting a test build, the automatic build manager 230 may perform an instant build, a reserved build, and a periodical build, through the test build scheduler 231.

The test build agent connector 232 may be connected to the plurality of test build agents 300, may transfer a test build request to the plurality of test build agents 300, and may receive a test result from a test build agent that performs a test among the plurality of test build agents 300.

The plurality of test build agents 300 may individually exist in various test target environments, for example, a Windows® environment and a Linux environment, and may communicate with the automatic build manager 230 in the testing automation server 200. Additionally, the test build agents 300 may compile a test application source code received from the automatic build manager 230, and may automatically perform a test.

Figure 3:
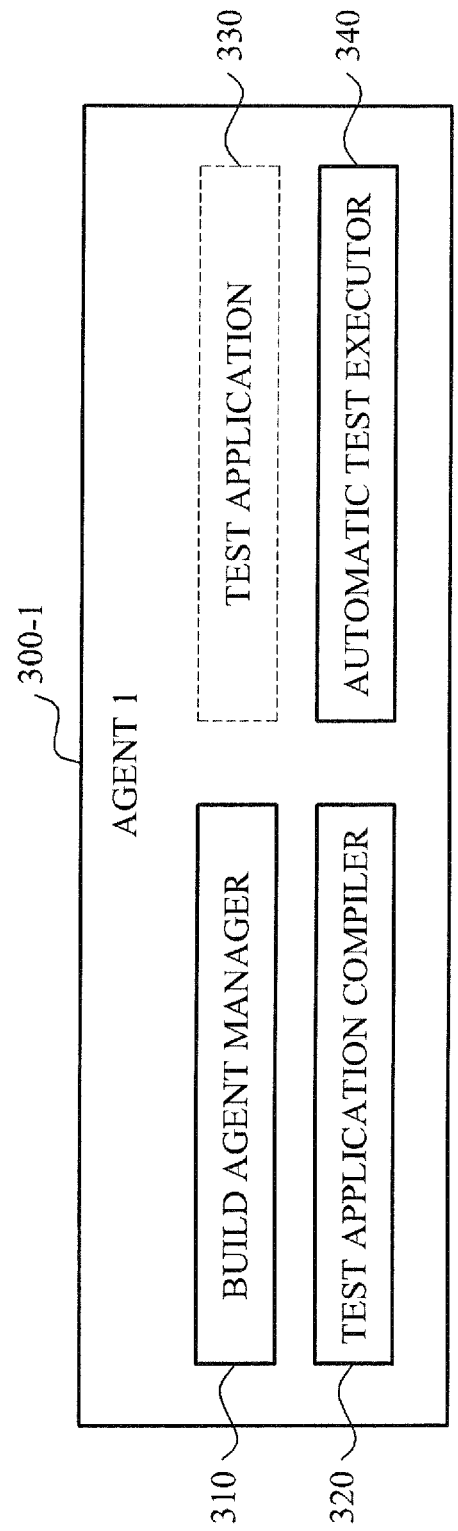
FIG. 3 is a diagram illustrating a test build agent of FIG. 1.

FIG. 3 further illustrates an agent 1 300-1 among the test build agents 300.

Referring to FIG. 3, the agent 1 300-1 may include a build agent manager 310, a test application compiler 320, a test application 330, and an automatic test executor 340.

The build agent manager 310 may be a module for managing automatic test build agents, and may receive a test build request from the automatic build manager 230 of the testing automation server 200, and may initiate a test build.

The test application compiler 320 may automatically compile components required for testing, and may upload, to the database 240 of the testing automation server 200, a compile log, an execution file, or a dynamic library file that are generated by the compiling.

The test application 330 may be connected to a robot hardware simulator, and may test a test target component. Specifically, the test application 330 may include required components, test cases, and test result files, and may be automatically executed by the test build agents (*the agent 1 installed in the test target environment. Additionally, the test application 330 may control a test simulation environment, an object in the environment, and an operation of a target robot using the required components and the robot hardware simulator based on the test cases.

The automatic test executor 340 may execute the test application 330, and may upload a log and a test result to the testing automation server 200. Here, the log and the test result may be output during testing.

The robot hardware simulator 400 may simulate a movement instead of having actual robot hardware perform movement, and may provide a virtual test environment. In particular, the robot hardware simulator 400 may be manually implemented so that the virtual test environment may be matched to characteristics of the test target component. Accordingly, the robot hardware simulator 400 may be connected to the test build agents 300, and may perform a simulation of virtual robot hardware and a robot test environment based on operations of the test build agents 300.

The robot hardware simulator 400 may be connected to the test application 330 of the agent 300-1, may control the virtual robot hardware, and may dynamically change a test environment for each test case, and may perform a test.

Figure 4:
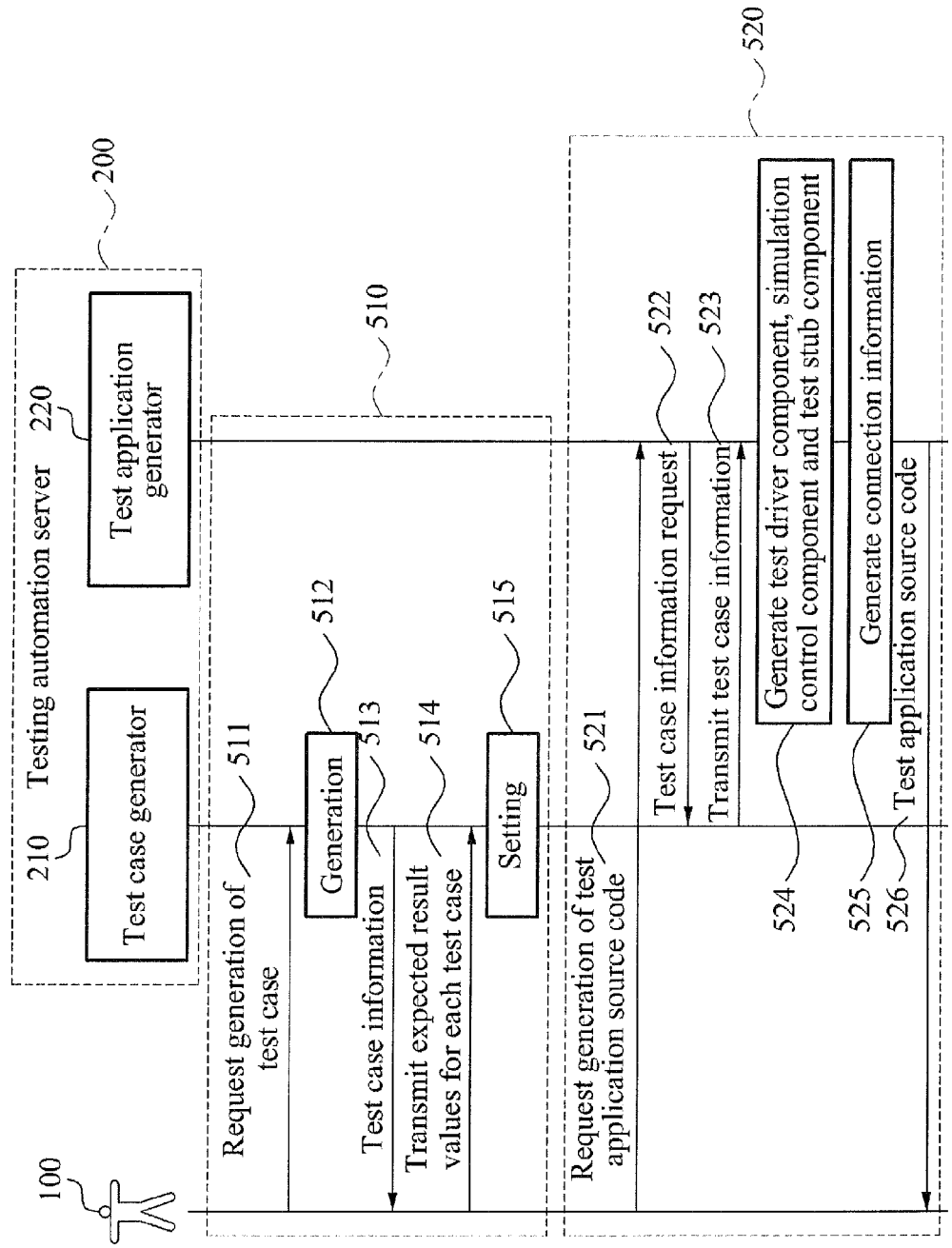
FIGS. 4 through 6 are flowcharts illustrating a simulation-based interface testing automation method for robot software components according to an embodiment of the present invention.
Figure 5:
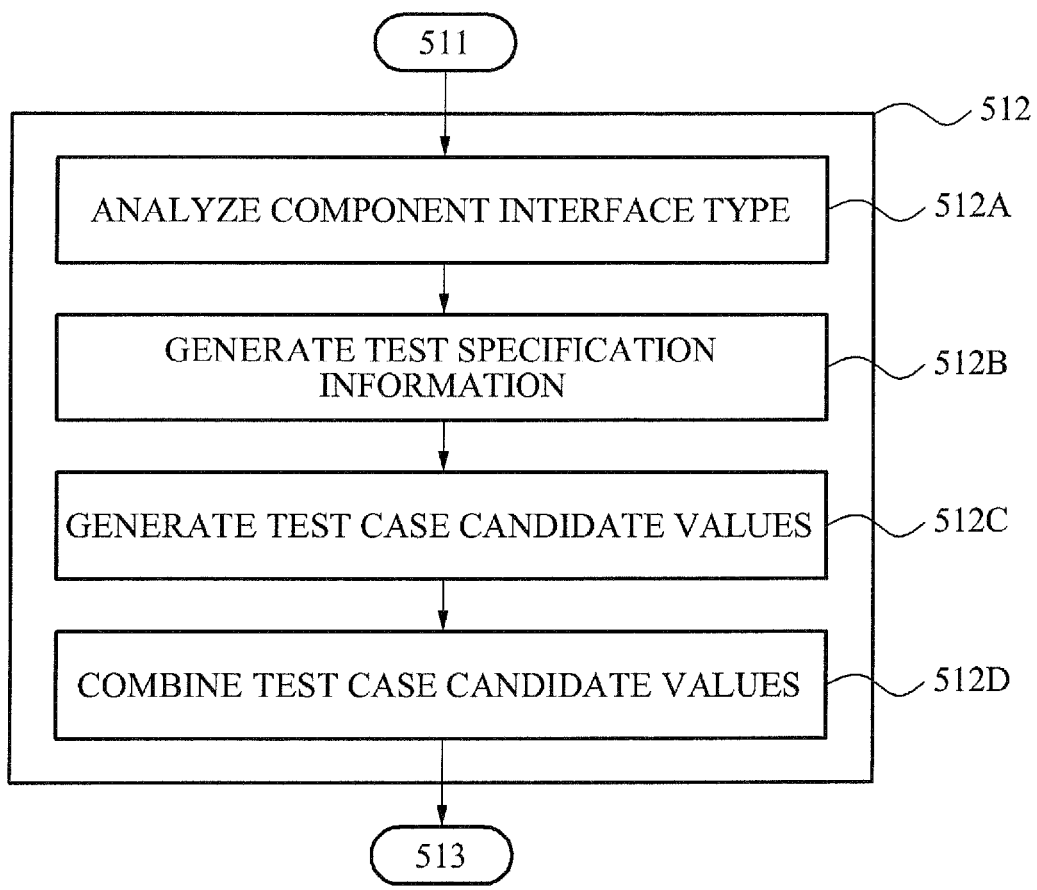
Figure 6:
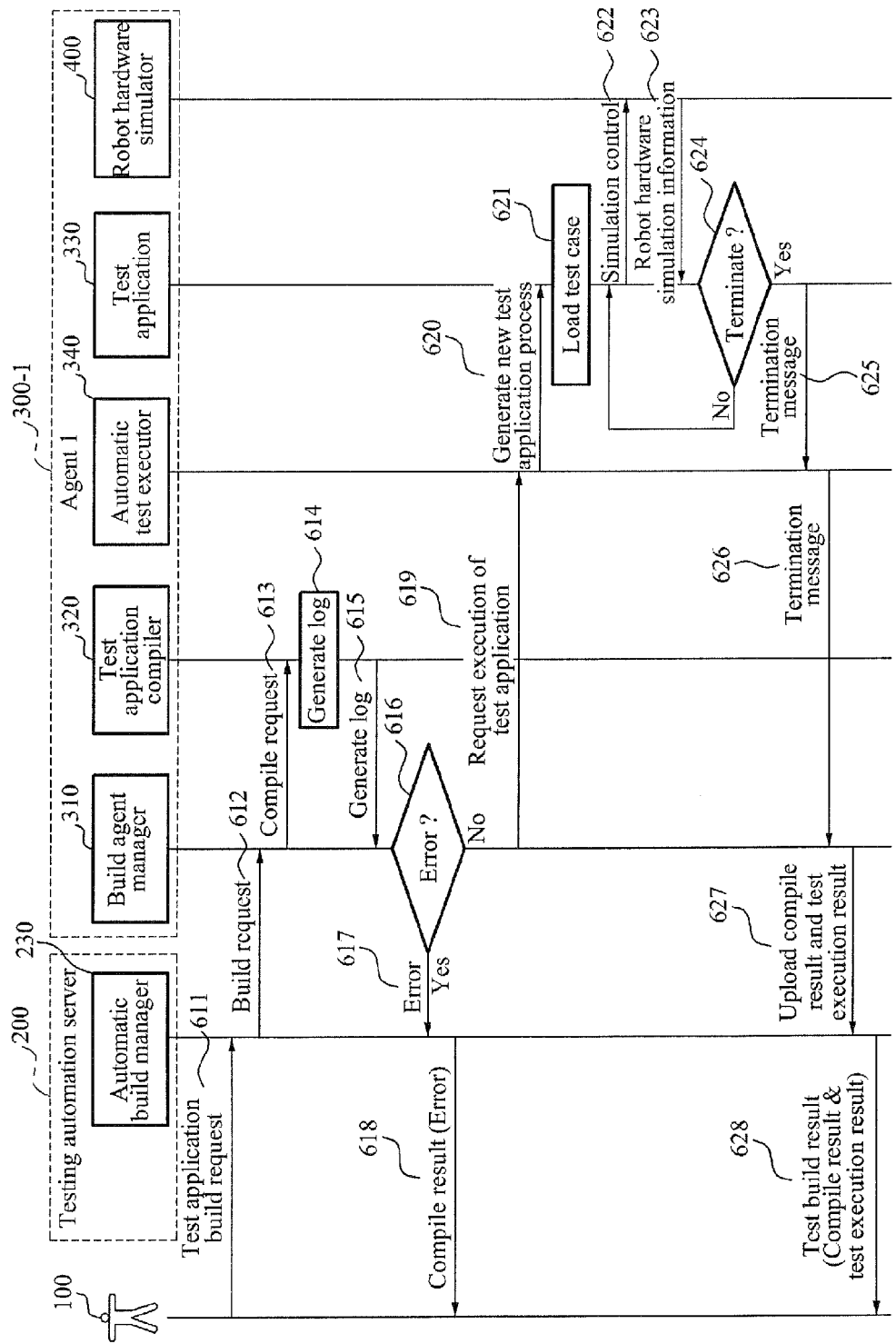

FIGS. 4 through 6 are flowcharts illustrating a simulation-based interface testing automation method for robot software components according to an embodiment of the present invention.

FIG. 4 illustrates operation 510 of generating test cases and operation 520 of generating a test application source code, and FIG. 5 illustrates operation 520 in further detail. FIG. 6 illustrates a scheme of automatically performing a test by operations 611 through 628.

Referring to FIG. 4, in operation 511, the user 100 may request the test case generator 210 of the testing automation server 200 to generate test cases, through a web interface.

In operation 512, in response to a request for generation of test cases, the test case generator 210 may analyze a type of a test target interface, and may receive test specification information input by the user 100. Additionally, in operation 512, the test case generator 210 may generate test cases based on a result of the analyzing of the test target interface and the test specification information, and may store the generated test cases in the database 240.

Hereinafter, operation 512 will be further described with reference to FIG. 5.

Referring to FIG. 5, the test case generator 210 may automatically generate test cases to perform interface testing of an actual robot software component.

According to an embodiment of the present invention, an interface of the robot software component may be implemented as a getDistanceValue interface of a robot infrared (IR) sensor component based on an Open Platform for Robotics Service (OPRoS) component structure. A black box test scheme may be adopted for a robot software component without any source code. However, the present invention is not limited thereto.

Here, the getDistanceValue interface may be used to measure a physical distance between an IR sensor and an obstacle, and to return the measured distance. The getDistanceValue interface may include a single output parameter, namely 'double', and two input parameters, namely 'int/IndexOfSensor', and 'int/NumOfSensor', as shown in Table 1 below.

TABLE 1

| Interface | getDistanceValue | |
| --- | --- | --- |
| Output parameter | Type/Name | Description |
| | double | Distance to obstacle |
| Input parameter | Int/IndexOfSensor | Index of IR sensor (values from 0 to 10) |
| | Int/NumOfSensor | Number of IR sensors |

TABLE 1-continued

| Interface | getDistanceValue |
|---|---|
|  | (values from 1 to 5) |

In operation 512A, an interface type of a test target component may be analyzed, and information on an input parameter of the test target component may be extracted. Specifically, in operation 512A, the interface parser 211 may parse and analyze interface representation information (for example, an IDL or an XML) of the test target component, and may extract the input parameter and type information regarding the input parameter.

In operation 512B, test specification information regarding each input parameter and robot hardware-related parameters of the interface may be generated. Specifically, the test specification information generated in operation 512B may be associated with the input parameter extracted in operation 512A, and a simulation control parameter.

In particular, the user 100 may input a range value of the input parameter of the interface, or a specific candidate value. When the test target component is connected to robot hardware, the user 100 may further input simulation control-related parameter information. Here, the user 100 may input values from 0 to 10 for the "IndexOfSensor" parameter of the getDistanceValue interface, and may input values from 1 to 5 for the "NumOfSensor" parameter of the getDistanceValue interface. Additionally, since the getDistanceValue interface may be used to measure a distance between an IR sensor (not shown) and an obstacle 20, and to return the measured distance, the user 100 may add a "#Distance" parameter, and may input the values from 0 to 10. Here, the "#Distance" parameter may be used to control a location of the obstacle 20 that is a virtual obstacle existing in a test simulation environment.

In operation 512C, test case candidate values may be generated for each parameter satisfying a test specification. Specifically, the test specification information generated in operation 512B may be used to generate the test case candidate values. In operation 512C, when the test specification information indicates values in a range, not a specific value, test case candidates may be automatically generated using the equivalence partitioning scheme or the boundary value analysis scheme.

In operation 512C, candidate values for each parameter for testing the getDistanceValue interface may be generated, as shown in Table 2 below.

TABLE 2

| Parameter type | Parameter name | Test case candidate value |
|---|---|---|
| Input parameter | IndexOfSensor | −1, 0, 5, 11 |
|  | NumOfSensor | −1, 1, 4, 7 |
| Simulation control parameter | #Distance | −1.0, 0.5, 5.7, 11.5 |

In Table 2, the "IndexOfSensor" and "NumOfSensor" parameters of the getDistanceValue interface may be of the type of TCIP, and the "#Distance" parameter may be of the type of TCSC.

In operation 512D, the test case candidate values for each parameter may be combined. Specifically, in operation 512D, the pair-wise scheme may be used to combine the test case candidate values generated in operation 512C, thereby reducing the number of test cases.

Referring to Table 2, the "IndexOfSensor", "NumOfSensor", and "#Distance" parameters may respectively include four candidate values. As a result, a number of all available combinations may be 64, as shown in Table 3 below.

TABLE 3

| Number | Parameter | | | Overlapping number between two parameters (I*N, D*I, N*D) |
|---|---|---|---|---|
|  | IndexOfSensor(I) | NumOfSensor(N) | #Distance(D) |  |
| 1 | −1 | −1 | −1.0 | 2, 13, 17 |
| 2 | −1 | −1 | 0.5 |  |
| 3 | −1 | −1 | 5.7 | 2, 7, 35 |
| 4 | −1 | −1 | 11.5 | 2, 12, 52 |
| 5 | −1 | 1 | −1.0 | 7, 13, 37 |
| 6 | −1 | 1 | 0.5 | 7, 2, 22 |
| 7 | −1 | 1 | 5.7 |  |
| 8 | −1 | 1 | 11.5 | 7, 12, 24 |
| ... |  |  |  |  |
| 48 | 5 | 7 | 11.5 |  |
| 52 | 11 | −1 | 11.5 |  |
| 54 | 11 | 1 | 0.5 |  |
| 57 | 11 | 4 | −1 |  |
| 63 | 11 | 7 | 5.7 |  |
| 64 | 11 | 7 | 11.5 | 63, 52, 48 |

However, when faults are caused by interactions of two parameters in the same manner as the getDistanceValue interface, the pair-wise scheme may be applied so that overlapping test cases may be removed among combination pairs of two parameters, such as I*N, D*I, and N*D. Specifically, referring to Table 3, (I*N)1={−1,−1}, (D*I)1={−1.0,−1}, and (N*D)1={−1,−1.0} may be generated as combination pairs of parameters in a first test case. A value of (I*N)1 may overlap with a value of (I*N)2 of a $2^{nd}$ test case, and a value of (D*I)1 may overlap with a value of (D*I)13 of a $13^{th}$ test case. Additionally, a value of (N*D)1 may overlap with a value of (N*D)17 of a $17^{th}$ test case. In other words, the pairs of each two of the parameters in the first test case overlap with other pairs in another test case and accordingly, overlapping test cases may be removed. When overlapping test cases are removed in the same manner as described above, a number of test cases may be reduced to 17, thereby obtaining a minimum number of combination pairs of two parameters.

The user 100 may remove overlapping test cases for a combination pair of two parameters, or a combination pair of three parameters. In operation 512D, the parameters may be combined in a 2-way combination (namely, pair-wise), a 3-way combination (namely, tri-wise), and all available combinations.

In operation 513, the test case generator 210 may transmit the generated test cases to the user 100. In operation 514, expected result values for each test case that are input by the user 100 may be transmitted to the test case generator 210. In operation 515, the expected result values may be set for each test case, and may be stored in the database 240.

To generate a test application source code, in operation 521, the user 100 may transmit a request for generation of a test application source code to the test application generator 220 of the testing automation server 200.

In operation 522, the test application generator 220 may transfer a test case information request to the test case generator 210. In operation 523, the test case generator 210 may transmit the test cases that are generated in advance to the test application generator 220.

In operation 524, the test application generator 220 may generate source codes of a test driver component and a simulation control component, based on the received test cases. In operation 524, when a test target component includes a required interface, the test application generator 220 may generate a test stub component including a provided interface with the same type as that of the test target component.

In operation 525, the test application generator 220 may generate connection information in the XML format, and may store the generated connection information in a file. Here, the connection information may be used to connect the test target component to each of the generated components. Additionally, codes stored in the file may be used as source codes of the test application.

In operation 526, the test application generator 220 may transmit the file to the user 100, so that the user 100 may check or modify the generated source code of the test application, using a web User Interface (UI).

FIG. 6 further illustrates operation 512 of automatically performing a test, and operation 512 of FIG. 6 may be initiated by generating the test application and the source code of the test application through the operations described with reference to FIGS. 4 and 5.

In operation 611, the user 100 may transfer a test application build request to the automatic build manager 230 of the testing automation server 200. Here, information of the test application build request may include identification information to identify the test build agents 300, for example an Internet Protocol (IP) address.

In operation 612, the automatic build manager 230 may determine whether the agent 1 300-1 associated with the information of the test application build request among the plurality of test build agents 300 is connected. When the agent 1 300-1 is determined to be connected, the automatic build manager 230 may send a request for a test application build to the build agent manager 310.

When the test application build is requested by the automatic build manager 230, the build agent manager 310 may download, from the testing automation server 200, the test case and the test application source code, and may transfer the downloaded test case and test application source code to the test application compiler 320 in operation 613. Additionally, in operation 613, the build agent manager 310 may send a compile request to the test application compiler 320.

In operation 614, the test application compiler 320 may compile the received test case and test application source code, and may generate a log file. In operation 615, a compile result and the log file obtained in operation 614 may be transferred to the build agent manager 310.

In operation 616, the build agent manager 310 may determine whether an error occurs during the compiling in operation 614.

When the error is determined to occur in operation 616, the compile result and the load file may be uploaded to the testing automation server 200 in operation 617, because the test application is not able to be executed due to the error. And In operation 618, a compile result and the log file obtained in operation 617 may be transferred to the user 100.

Conversely, when determining that there is no error in operation 616, the build agent manager 310 may request the automatic test executor 340 to execute the test application in operation 619. In operation 620, the automatic test executor 340 may generate a new test application process, and may execute a new test application.

In operation 621, the test case may be loaded from the executed test application 330. In operation 622, the simulation control may be performed by a connection to the robot hardware simulator 400. In operation 623, robot hardware simulation information generated based on a control result may be transferred to the test application 330. In operation 624, the test application 330 may determine continuation or termination based on whether the robot hardware simulation information for the test is completely transferred and acquired. Operations 622 and 623 may be repeated based on a result of the determining in operation 624.

When the termination is determined in operation 624, the test application 330 may transfer a termination message to the automatic test executor 340 in operation 625, and the automatic test executor 340 may transfer the termination message to the build agent manager 310 in operation 626. In operation 627, the build agent manager 310 may upload, to the testing automation server 200, the compile result and a test execution result of the test application. In operation 628, the automatic build manager 230 may analyze the uploaded compile result and test execution result to obtain a test build result, so that the test build result may be transferred to the user 100. The user 100 may determine, based on the received test build result, whether an error occurs in an interface targeted for testing.

Figure 7:
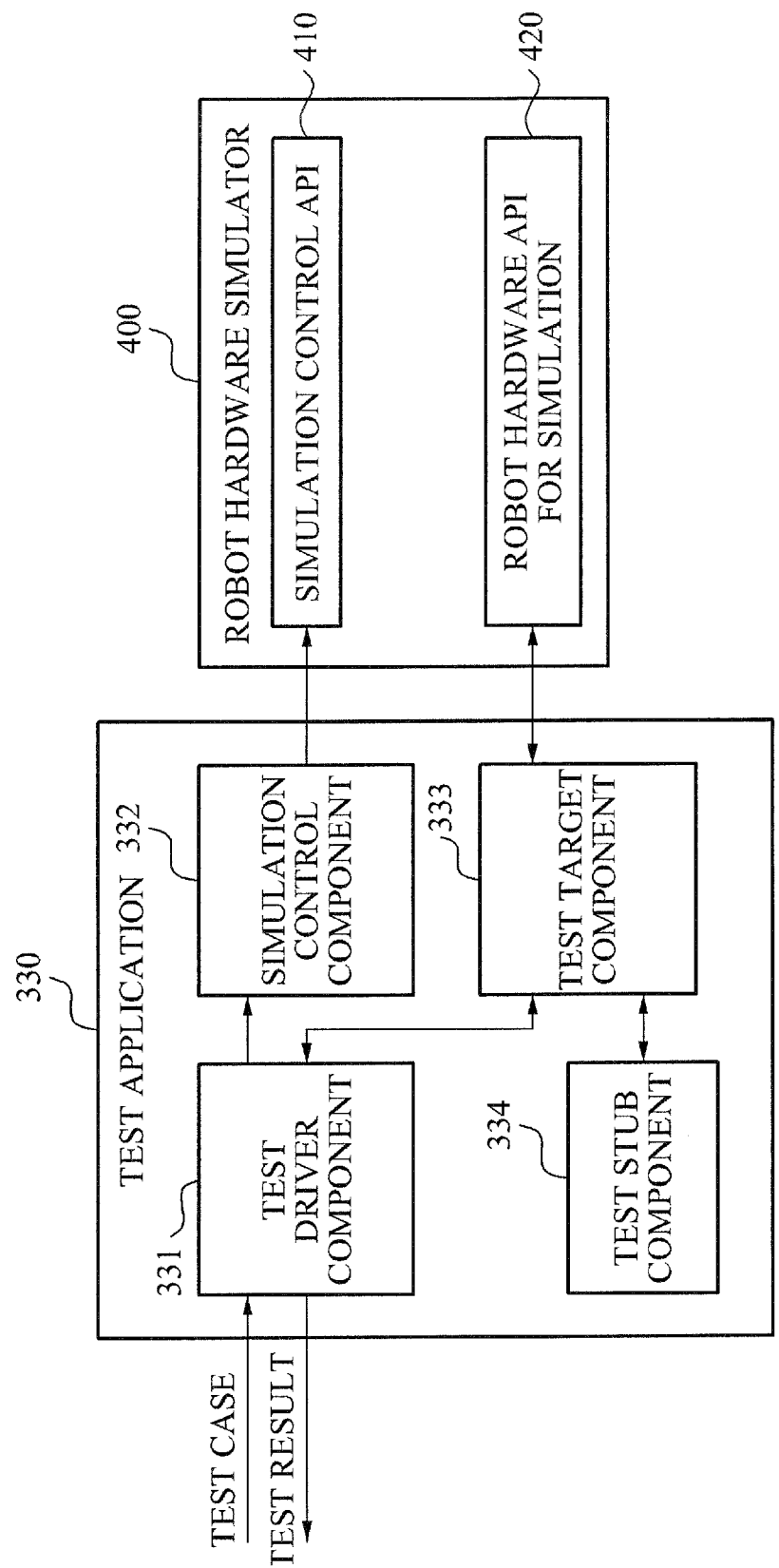
FIG. 7 is a diagram illustrating configurations and operations of a test application and a robot hardware simulator of FIG. 6.

FIG. 7 is a diagram illustrating configurations and operations of the test application 330 and the robot hardware simulator 400.

Referring to FIG. 7, the test application 330 may include a test driver component 331, a simulation control component 332, and a test target component 333.

The test driver component 331 may be used to control an overall test operation, and may function to read a test case file and to test a test target interface. The test driver component 331 may divide a test case inputted during a test into a TCSC and a TCIP, and may set a test simulation environment through an interface of a simulation control component using the TCSC. Additionally, the test driver component 331 may call the test target interface using the TCIP, may perform the test, and may store a test result in a file.

The simulation control component 332 may be used to set a test simulation environment based on the TCSC, and may control an object in the test simulation environment using a simulation control Application Programming Interface (API) 410 provided by the robot hardware simulator 400. Additionally, the simulation control component 332 may distinguish a test driver from a simulation control part during the test, may control the robot hardware simulator 400 variously based on input parameters of the same interface, and may perform the test so that a reusability of a test case may be increased.

The test target component 333 may function to receive robot hardware information from the robot hardware simulator 400 using a robot hardware API for simulation 420 that includes an identical interface to that of an actual robot hardware API, during the test.

Here, when the test target component 333 includes a required interface, and when there is no component including a provided interface with the same type as the required interface, any function may be performed. Since this situation may occur in development of component-based software, the test application 330 may further include a test stub component 334 including a virtual interface having the same type as the required interface. The test stub component 334 may be used instead of an actual robot software component, to support the test target component 333 so that the test target component 333 may perform its function.

The robot hardware simulator 400 may include the simulation control API 410, and the robot hardware API for simulation 420, as shown in FIG. 7.

The simulation control API 410 may be used to control a virtual test environment. The simulation control component 332 of the test application 330 may dynamically change a test environment for each test case using the simulation control API 410, to perform a test.

The robot hardware API for simulation 420 may be used to control virtual robot hardware or to receive data. The test target component 333 of the test application 330 may control the virtual robot hardware or receive data, using the robot hardware API for simulation 420.

The test application 330 and the robot hardware simulator 400 may be connected to each other, and may perform the following operations to test a target interface.

The test driver component 331 may load a test case file, and may transmit the TCSC through a simulation control interface of the simulation control component 332, to set a virtual test environment. The simulation control component 332 may change a location of an object existing in the virtual test environment based on the TCSC, using the simulation control API 410 provided by the robot hardware simulator 400.

When the virtual test environment is completely set, the test driver component 331 may call a test target interface using the TCIP as an input parameter. The test target component 333 may call an interface of the test stub component 334, and may process or receive data using the robot hardware API for simulation 420.

When the operation is completed, a result value of the operation may be returned to the test driver component 331. The test driver component 331 may compare the returned result value with the expected result values, and may store information indicating whether the test succeeds in a test result file, to complete the test.

Figure 8:
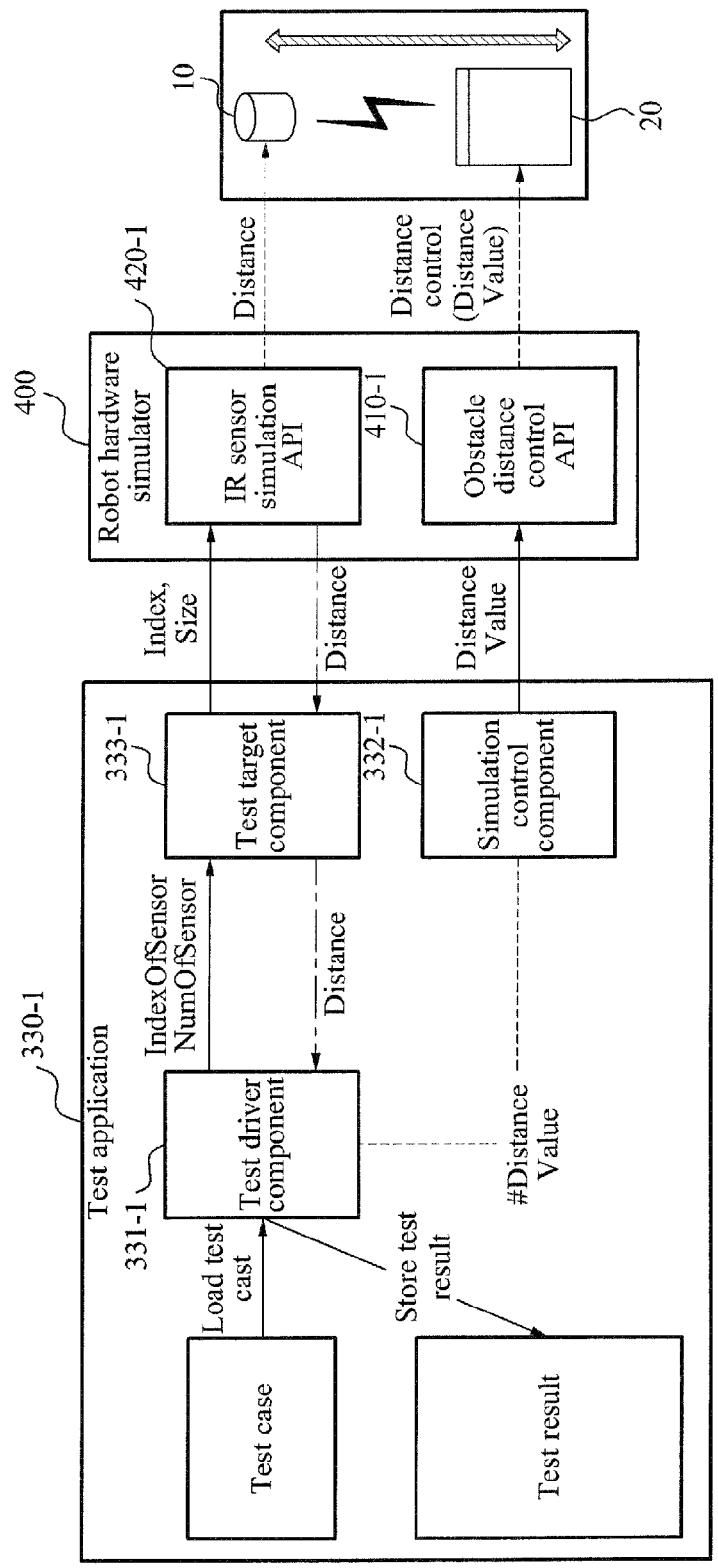
FIG. 8 is a diagram illustrating configurations of a test application and a robot hardware simulator in a simulation-based interface testing automation system for robot software components according to an embodiment of the present invention.

FIG. 8 is a diagram illustrating an example of the test application 330 and the robot hardware simulator 400 of FIG. 7.

Referring to FIG. 8, to describe an availability and effects of the example and embodiments of the present invention, a test application 330-1 may be implemented to perform a test for the getDistanceValue interface of the robot IR sensor component based on the OPRoS component structure, and may analyze a result of the test.

For example, when a location of an obstacle 20 is changed, the test application 330 may test whether the getDistanceValue interface of a robot 10 equipped with an IR sensor is able to receive a distance between the IR sensor and the obstacle 20 of which the location is changed.

Accordingly, the robot hardware simulator 400 may be installed with an OPRoS simulator. Since the required interface does not exist in an OPRoS IR sensor component, the test application 330-1 may not generate the test stub component 334.

The testing automation server 200 may generate test cases for the getDistanceValue interface. The generated test cases may be shown in Table 3 and FIG. 9.

The user 100 may manually insert expected result values for each test case, and the test application generator 220 of the testing automation server 200 may generate a source code of a test application. FIG. 10 illustrates an example of the source code of the test application generated by the test application generator 220.

The test for the getDistanceValue interface may be performed by the test application 330-1 and the robot hardware simulator 400.

Specifically, the test driver component 331-1 may load the test case file, and may input a "#DistanceValue" to the simulation control component 332-1, to set a test environment. The simulation control component 332 may transfer the input "#DistanceValue" to an obstacle distance control API 410-1, namely, the simulation control API 410 of the robot hardware simulator 400.

The test driver component 331-1 for the getDistanceValue interface may load a test case file in the XML format, and may classify the loaded test case file into a type of TCSC, namely #Distance, and a type of TCIP, namely IndexOfSensor, and NumOfSensor.

Accordingly, the simulation control component 332-1 may move the obstacle 20 from the IR sensor by a test case value of "#Distance", using the obstacle distance control API 410-1 provided by the robot hardware simulator 400.

When the obstacle 20 is completely moved, the test driver component 331-1 may call the getDistanceValue interface of the test target component 333-1 using test case values of "IndexOfSensor", and "NumOfSensor" as input parameters. The test target component 333-1 may be used as an OPRoS IR sensor component, to calculate a distance value representing a distance between the obstacle 20 and the robot 10 with the IR sensor (not shown) and to return the distance value to the test driver component 331-1, using an IR sensor simulation API 420-1 provided by the robot hardware simulator 400.

The test driver component 331-1 may compare the distance value returned by the test target component 333-1 with the expected result values input by the user 100, and may store information indicating whether the test succeeds in a test result file, to complete the test.

FIG. 11 illustrates a result of the test for the getDistanceValue interface performed by the test application 330-1 and the robot hardware simulator 400 of FIG. 8.

Referring to FIG. 11, first through third columns, namely "IndexOfSensor," "NumOfSensor," and "#Distance," may indicate test cases. Additionally, a fourth column, namely "return," may indicate an actual result value that is returned, and a fifth column, namely "result," may indicate whether the test result is "pass" or "fail".

Specifically, #Distance may denote a distance between the IR sensor and the obstacle 20, and a value of "−1" may be outside of a range. For example, in a first test case of FIG. 11, values of "5", "1", and "−1" may be respectively input as values of the test cases, namely IndexOfSensor, NumOfSensor, and #Distance. In this example, a value of "1" may be output as an actual result value, and a test result may be determined as "PASS" since the test is successfully completed.

As another example, in a sixth test case of FIG. 11, values of "IndexOfSensor", "NumOfSensor", and "#Distance" may be respectively represented as "5", "4", and "0.5". In other words, the value of "#Distance", namely the distance between the IR sensor and the obstacle 20, is expected as "0.5", and a value of "0.5" may also be output as an actual result value. In this example, a test result may be determined as "PASS" based on the fifth column.

Referring to the fifth column of FIG. 11, tests for all test cases may be determined to be successfully completed. Thus, it is possible to test whether OPRoS IR sensor components are functioning normally.

The methods according to the embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A testing automation method, comprising:
receiving, as input by a user, test specification information and an expected result value for a test case;
generating a test case based on interface representation information and the test specification information, the interface representation information and the test specification information being associated with a robot software component of a target robot to be tested;
generating a source code of a test application based on the test case, the source code being used to test the robot software component;
compiling the source code of the test application using the test case, connecting the source code to a robot hardware simulator while executing the compiled test application, and outputting a result corresponding to the test case, said result being based at least in part on information received from the robot hardware simulator while executing the compiled test application; and
comparing the output result with the expected result value, wherein the outputting of the result comprises:
compiling a source code of a test application, when a build of the test application is requested;
controlling a test simulation environment, an object in the environment, and an operation of the target robot using components of the test application and the robot hardware simulator based on the test case, when executing the test application having the compiled source code; and
outputting an execution result of the controlled test application,
wherein the generating of the test case comprises:
parsing the interface representation information and extracting information regarding input and output parameters of the robot software component;
generating a plurality of test case candidates of the robot software component based on the test specification information; and
combining the plurality of generated test case candidates to generate at least one test case based on the test specification information.

2. The testing automation method of claim 1, wherein the controlling comprises connecting the test application to the robot hardware simulator and controlling at least one of a test driver component, a simulation control component, and a test stub component of the test application, based on the test case.

3. The testing automation method of claim 1, further comprising:
requesting a build of the test application at a predetermined point in time or periodically.

4. The testing automation method of claim 1, wherein the generating of the plurality of test case candidates comprises:
generating test case candidates of a type of a test case for input parameter, and a type of a test case for simulation control, based on the interface representation information and the test specification information.

5. The testing automation method of claim 1, wherein the generating of the source code comprises:
generating at least one of a test driver component, a simulation control component, and a test stub component, based on the test case and information regarding a robot software component of the target robot to be tested; and
connecting at least two of the generated test driver component, the generated simulation control component, and the generated test stub component to each other, and generating a single source code of the test application.

6. A testing automation system, comprising:
a testing automation server on a host computer having a processor to generate a test case, and a source code of a test application, based on interface representation information and test specification information, the test specification information being received as input by a user, the interface representation information and the test specification information being associated with a robot software component of a target robot to be tested;
a test build agent to compile the source code of the test application using the test case, and to output a result corresponding to the test case while executing the compiled test application;
a robot hardware simulator to perform a simulation of virtual robot hardware and a robot test environment based on an operation of the test build agent, the robot hardware simulator being connected to the test build agent, wherein the output result is based at least in part on information received from the robot hardware simulator while executing the compiled test application; and
a test driver component to compare the output result with an expected result value, received as input by a user,
wherein the test build agent controls a test simulation environment, an object in the environment, and an operation of the target robot using components of the test application and the robot hardware simulator based on the test case, when executing the test application having the compiled source code,
wherein the testing automation server comprises:
an interface parser to parse the interface representation information and to extract information regarding input and output parameters of the robot software component;
a test case candidate generator to generate a plurality of test case candidates of the robot software component based on the test specification information; and
a test case combination generator to generate a plurality of test cases of the robot software component through a combination of the plurality of generated test case candidates.

7. The testing automation system of claim 6, wherein the test build agent controls at least one of the test driver component, a simulation control component, and a test stub component of the test application, based on the test case, and controls an operation of the robot hardware simulator.

8. The testing automation system of claim 6, wherein the testing automation server further comprises a test build scheduler to request a build of the test application at a predetermined point in time or periodically.

9. The testing automation system of claim 6, wherein a plurality of test build agents exist based on a plurality of test target environments, and
wherein, when a request for a build of a test application is received from a user, the testing automation server selects a test build agent associated with the request from among the plurality of test build agents, and transfers the request to the selected test build agent.

10. The testing automation system of claim 6, wherein the test case candidate generator generates test case candidates of a type of a test case for input parameter, and a type of a test case for simulation control, based on the interface representation information and the test specification information.

11. The testing automation system of claim 6, wherein the testing automation server generates at least one of the test driver component, a simulation control component, and a test stub component, based on the interface representation information and the test specification information, connects at least two of the generated test driver component, the generated simulation control component, and the generated test stub component to each other, and generates a single source code of the test application.

\* \* \* \* \*

UNITED STATES PATENT AND TRADEMARK OFFICE
CERTIFICATE OF CORRECTION

| | | |
|---|---|---|
| PATENT NO. | : 8,601,436 B2 | Page 1 of 1 |
| APPLICATION NO. | : 12/853475 | |
| DATED | : December 3, 2013 | |
| INVENTOR(S) | : Park et al. | |

It is certified that error appears in the above-identified patent and that said Letters Patent is hereby corrected as shown below:

On the Title Page, item (75)

Residence city for inventor San Woo Meng, "Donghae-si" should be --Gangwon-do--.

Residence city for inventor Si Wan Kim, "Chuncheon-si" should be --Gangwon-do--.

Signed and Sealed this
Fifth Day of August, 2014

Michelle K. Lee
*Deputy Director of the United States Patent and Trademark Office*